US009153099B2

(12) United States Patent
D'Angelo

(10) Patent No.: US 9,153,099 B2
(45) Date of Patent: *Oct. 6, 2015

(54) PROGRESSIVE BETTING POOLS

(71) Applicant: Razor Sports, Inc., Freehold, NJ (US)

(72) Inventor: Kenneth D'Angelo, Freehold, NJ (US)

(73) Assignee: Razor Sports, Inc., Freehold, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,363

(22) Filed: Oct. 1, 2014

(65) Prior Publication Data

US 2015/0018086 A1 Jan. 15, 2015

Related U.S. Application Data

(63) Continuation of application No. 13/726,453, filed on Dec. 24, 2012, now Pat. No. 8,876,593.

(60) Provisional application No. 61/579,874, filed on Dec. 23, 2011.

(51) Int. Cl.
*G06F 17/00* (2006.01)
*G07F 17/32* (2006.01)
*A63F 13/30* (2014.01)

(52) U.S. Cl.
CPC ............ *G07F 17/3258* (2013.01); *A63F 13/12* (2013.01); *G07F 17/3276* (2013.01); *G07F 17/3288* (2013.01)

(58) Field of Classification Search
USPC ...................................................... 463/16–27
See application file for complete search history.

(56) References Cited

U.S. PATENT DOCUMENTS 5,564,977 A 10/1996 Algie
5,573,244 A 11/1996 Mindes
5,842,921 A 12/1998 Mindes et al.
6,004,211 A 12/1999 Brenner et al.
6,024,641 A 2/2000 Sarno (Continued)

FOREIGN PATENT DOCUMENTS

CA 2 499 028 2/2004
EP 2 794 038 10/2014

(Continued)

OTHER PUBLICATIONS

PCT Application No. PCT/US2012/71586, International Search Report dated Apr. 22, 2013.

(Continued)

*Primary Examiner* — Ronald Laneau
(74) *Attorney, Agent, or Firm* — Lewis Roca Rothgerber LLP

(57) ABSTRACT

Progressive betting pools are provided. A betting administrator may define a set of competition-based events upon which to wager. For example, a set of six soccer matches that occur during a week may be defined as being available for wagering. Each wager may include specifications as to the winner of each of the selected matches. In some embodiments, the wagering individual may be requested to specify certain tie-breaking metrics (e.g., rank the teams by number of goals), which may be considered in the event of a tie between two or more wagers. The wager may be available for a limited window of time. Following which, the outcomes of the competition-based events may be decided and provided to a server, which determines one or more winners and calculates payouts for the determined winners.

19 Claims, 8 Drawing Sheets

(56) References Cited

U.S. PATENT DOCUMENTS

| | | | | |
|---|---|---|---|---|
| 6,092,806 | A | 7/2000 | Follis | |
| 6,102,797 | A | 8/2000 | Kail | |
| 6,126,543 | A | 10/2000 | Friedman | |
| 6,347,086 | B1 | 2/2002 | Strachan | |
| 6,464,583 | B1 | 10/2002 | Kidron | |
| 6,656,042 | B2 | 12/2003 | Reiss et al. | |
| 6,674,448 | B1 | 1/2004 | Garahi et al. | |
| 6,688,978 | B1 | 2/2004 | Herman | |
| 6,902,480 | B2 | 6/2005 | Kidron | |
| 6,910,965 | B2 | 6/2005 | Downes | |
| 7,094,151 | B2 | 8/2006 | Downes | |
| 7,201,658 | B2 | 4/2007 | Marshall et al. | |
| 7,379,886 | B1 | 5/2008 | Zaring et al. | |
| 7,458,891 | B2 | 12/2008 | Asher et al. | |
| 7,485,037 | B2 | 2/2009 | Penrice | |
| 7,674,170 | B2 | 3/2010 | Odom et al. | |
| 7,708,636 | B2 | 5/2010 | Asher et al. | |
| 7,789,754 | B2 | 9/2010 | Asher et al. | |
| 7,887,406 | B2 | 2/2011 | Odom et al. | |
| 8,062,111 | B2 | 11/2011 | Aronson et al. | |
| 8,152,630 | B2 * | 4/2012 | Cohen | 463/25 |
| 8,342,959 | B2 | 1/2013 | Mahaffey et al. | |
| 8,353,763 | B2 | 1/2013 | Amaitis et al. | |
| 8,419,544 | B2 | 4/2013 | McNutt et al. | |
| 8,690,657 | B2 | 4/2014 | D'Angelo | |
| 8,876,593 | B2 | 11/2014 | D'Angelo | |
| 8,968,083 | B2 * | 3/2015 | Nicely et al. | 463/27 |
| 2001/0004606 | A1 | 6/2001 | Tracy et al. | |
| 2001/0039209 | A1 | 11/2001 | DeWeese et al. | |
| 2002/0068633 | A1 | 6/2002 | Schlaifer | |
| 2002/0115488 | A1 | 8/2002 | Berry et al. | |
| 2002/0151340 | A1 | 10/2002 | Guinn et al. | |
| 2002/0151342 | A1 | 10/2002 | Tracy et al. | |
| 2003/0119576 | A1 | 6/2003 | McClintic et al. | |
| 2003/0157976 | A1 | 8/2003 | Simon et al. | |
| 2003/0199315 | A1 | 10/2003 | Downes | |
| 2004/0029627 | A1 | 2/2004 | Hannan et al. | |
| 2004/0048656 | A1 | 3/2004 | Krynicky | |
| 2004/0063484 | A1 | 4/2004 | Dreaper et al. | |
| 2004/0111358 | A1 | 6/2004 | Lange et al. | |
| 2005/0075164 | A1 | 4/2005 | Krynicky | |
| 2005/0181869 | A1 | 8/2005 | Downes | |
| 2005/0239542 | A1 | 10/2005 | Olsen | |
| 2007/0202939 | A1 | 8/2007 | Hannan et al. | |
| 2008/0113771 | A1 | 5/2008 | Baerlocher et al. | |
| 2008/0113816 | A1 | 5/2008 | Mahaffey et al. | |
| 2009/0061974 | A1 * | 3/2009 | Lutnick et al. | 463/13 |
| 2010/0048302 | A1 | 2/2010 | Lutrick et al. | |
| 2010/0069137 | A1 | 3/2010 | D'Angelo | |
| 2010/0113162 | A1 | 5/2010 | Vemuri et al. | |
| 2012/0276986 | A1 | 11/2012 | Baerlocher et al. | |
| 2013/0102372 | A1 * | 4/2013 | Lutnick et al. | 463/13 |
| 2013/0184068 | A1 | 7/2013 | D'Angelo | |
| 2014/0148238 | A1 | 5/2014 | D'Angelo | |

FOREIGN PATENT DOCUMENTS

| | | |
|---|---|---|
| WO | WO 00/67215 | 11/2000 |
| WO | WO 01/48713 | 7/2001 |
| WO | WO 2013/096963 | 6/2013 |

OTHER PUBLICATIONS

PCT Application No. PCT/US2012/71586, Written Opinion dated Apr. 22, 2013.

U.S. Appl. No. 11/742,921; Office Action mailed Mar. 22, 2013.

U.S. Appl. No. 11/742,921; Office Action mailed Apr. 1, 2011.

U.S. Appl. No. 13/726,453; Office Action mailed Mar. 5, 2014.

European Patent Application No. 12860204.2, European Extended Search Report dated Jan. 21, 2015.

* cited by examiner (EPL) FOOTBALL LEAGUE RESULTS OF SELECTED WEEK # 3

Saturday, 27 August 2011

| Status | Home | Score | Away | Venue |
|---|---|---|---|---|
| Final | Aston Villa | 0-0 | Wolverhampton Wanderers | Villa Part (30,776) |
| Final | Wigan Athletic | 2-0 | Queens Park Rangers | DW Stadium (17,225) |
| Final | Blackburn Rovers | 0-1 | Everton | Ewood Park (22,826) |
| Final | Chelsea | 3-1 | Norwich City | Stamford Bridge (41,765) |
| Final | Swansea City | 0-0 | Sunderland | Liberty Stadium (19,938) |
| Final | Liverpool | 3-1 | Bolton Wanderers | Anfield (44,725) |

Sunday, 28 August 2011

| Status | Home | Score | Away | Venue |
|---|---|---|---|---|
| Final | Newcastle United | 2-1 | Fulham | St James' Park (42,684) |
| Final | Tottenham Hotspur | 1-5 | Manchester City | White Hart Lane (36,150) |
| Final | West Bromwich Albion | 0-1 | Stoke City | The Hawthorns (22,909) |
| Final | Manchester United | 8-2 | Arsenal | Old Trafford (75,448) |

| TEAMS WITH THE HIGHEST FINAL NUMBER OF GOALS (IN EXACT ORDER 1ST THRU 6TH) | | | | |
|---|---|---|---|---|
| 1ST | MANCHESTER UNITED | HOME | (8) GOALS | |
| 2ND | MANCHESTER CITY | AWAY** | (5) GOALS | |
| 3RD | CHELSEA | HOME | (3) GOALS * | (7) SHOTS ON GOAL* |
| 4TH | LIVERPOOL | HOME | (3) GOALS * | (6) SHOTS ON GOAL* |
| 5TH | ARSENAL | AWAY** | (2) GOALS * | |
| 6TH | NEWCASTLE UNITED | HOME | (2) GOALS * | (6) SHOTS ON GOAL* |
| TIE | WIGAN ATHLETIC | HOME | (2) GOALS * | (5) SHOTS ON GOAL* |

* TIE BREAKERS (SEE RULES)

** AWAY TEAM'S GOALS COUNT (FIRST ABOVE) HOME TEAM'S GOALS

FIG. 8

PROGRESSIVE BETTING POOLS

CROSS-REFERENCE TO RELATED APPLICATIONS

The present application is a continuation and claims the priority benefit of U.S. patent application Ser. No. 13/726,453 filed Dec. 24, 2012, which claims the priority benefit of U.S. provisional patent application 61/579,874 filed on Dec. 23, 2011, the disclosures of which are incorporated herein by reference.

BACKGROUND OF THE INVENTION

1. Field of the Invention

The present invention generally relates to betting. More specifically, the present invention relates to progressive betting pools.

2. Description of the Related Art

Typical betting on competition-based events involves placing wagers on individual events. Occasionally, a sporting league or association may define a set of multiple competition-based events (e.g., a tournament or playoff) for which wagers may be placed. In such instances, some betting pools may accept wagers on a defined set of multiple events. Such tournaments are less common, however, than regular season events. Betting on individual, regular season events may be less challenging or less exciting in comparison. Some bettors may therefore wish to have the experience of placing a wager on multiple events for the challenge, opportunity to test and display their skill and knowledge, and the excitement associated with the foregoing.

There is, therefore, a need in the art for new systems and methods for progressive betting pools.

SUMMARY OF THE CLAIMED INVENTION

Embodiments of the present invention allow for progressive betting pools. A betting administrator may define a set of competition-based events upon which to wager. For example, a set of six soccer matches that occur during a week may be defined as being available for wagering. Each wager may include specifications as to the winner of each of the selected matches. In some embodiments, the wagering individual may be requested to specify certain tie-breaking metrics (e.g., rank the teams by number of goals), which may be considered in the event of a tie between two or more wagers. The wager may be available for a limited window of time. Following which, the outcomes of the competition-based events may be decided and provided to a server, which determines one or more winners and calculates payouts for the determined winners.

Various embodiments include methods for progressive betting pools. Such methods may include storing information in memory regarding a plurality of competition-based events having a plurality of possible outcomes, receiving wagers each specifying a set of outcomes for a set of competition-based events, receiving information regarding outcomes of the set of competition-based events, and executing instructions to determine one or more winners based on the received outcomes and one or more algorithms for ranking the wagers and to calculate payouts in accordance with the determined winners and ranked wagers. The determined winners (and other participants) may be sent a notification regarding the outcomes and calculated payouts.

Embodiments of the present invention may additionally include system for progressive betting pools. Such systems may include one or more client devices for submitting wagers over a communication network. Each wager may specify a set of outcomes for a set of competition-based events. Systems may additionally include a server that stores information regarding a plurality of competition-based events that have a plurality of possible outcomes, receives wagers and information sent over a communication network regarding outcomes of the set of competition-based events, determines one or more winners from based on the received outcomes and one or more algorithms for ranking the wagers, and calculates payouts in accordance with the determined winners and ranked wagers. The server may also send a notification to each of the winners regarding the outcomes and calculated payouts. Systems may additionally include one or more data sources for providing data regarding the outcomes of the competition-based events.

Other embodiments of the present invention include non-transitory computer-readable storage media on which is embodied instructions executable to perform a method for progressive betting pools as previously set forth above.

BRIEF DESCRIPTION OF THE FIGURES

FIG. 8 is a screenshot of exemplary tables of results for a set of competition-based events.

DETAILED DESCRIPTION

Embodiments of the present invention allow for progressive betting pools. A betting administrator may define a set of competition-based events upon which to wager. For example, a set of six soccer matches that occur during a week may be defined as being available for wagering. Each wager may include specifications as to the winner of each of the selected matches. In some embodiments, the wagering individual may be requested to specify certain tie-breaking metrics (e.g., rank the teams by number of goals), which may be considered in the event of a tie between two or more wagers. The wager may be available for a limited window of time. Following which, the outcomes of the competition-based events may be decided and provided to a server, which determines one or more winners and calculates payouts for the determined winners.

Figure 1:
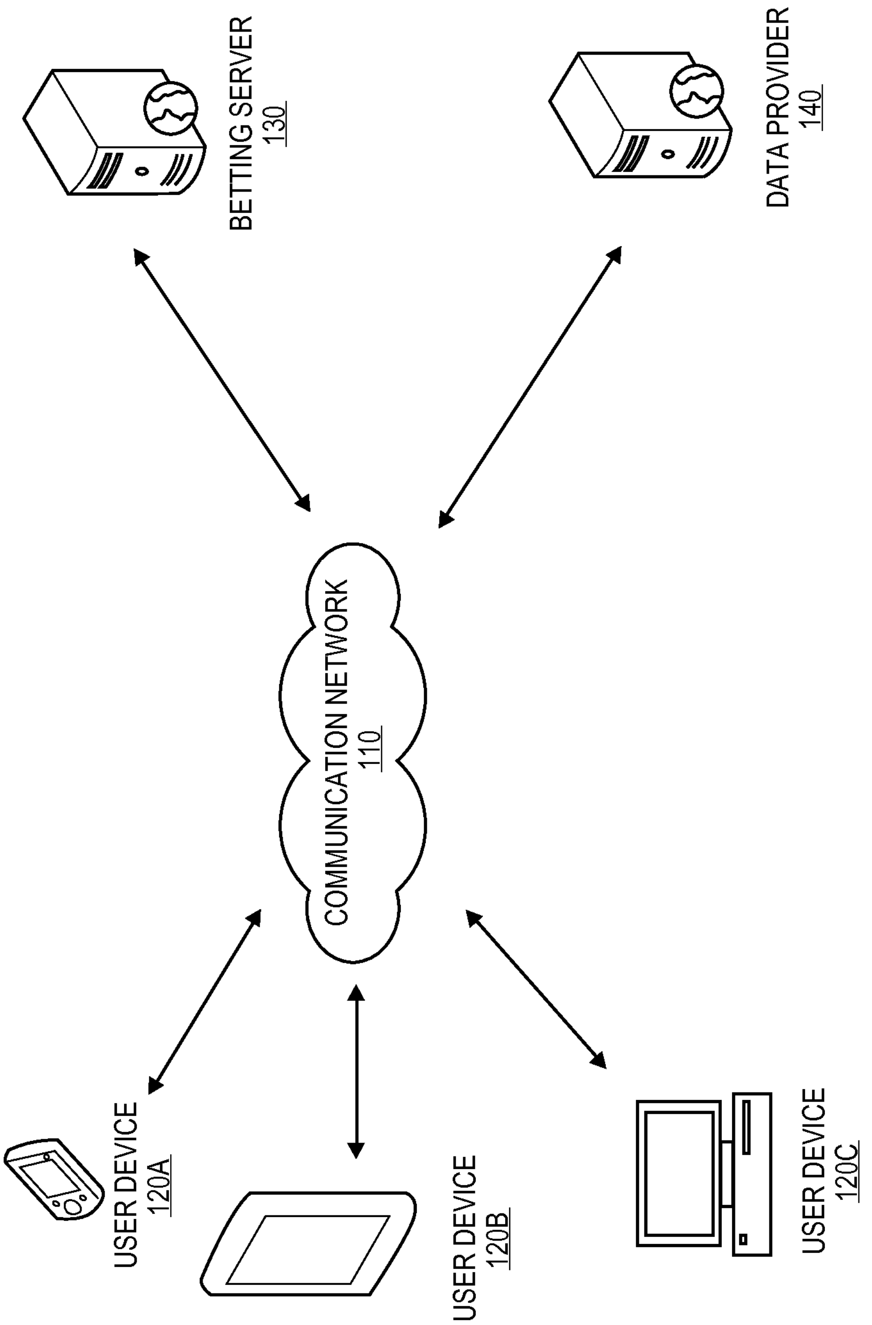
FIG. 1 illustrates an exemplary network environment in which a system for progressive betting pools may be implemented.

FIG. 1 illustrates an exemplary network environment 100 in which a system for progressive betting pools may be implemented. Network environment 100 may include a communication network 110, one or more user devices 120A-C, one or more betting servers 130, and one or more data providers 140. Devices in network environment 100 may communicate with each other via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

User devices 120 may comprise any suitable network-adapted device capable of communicating with other devices in the network system according to an established protocol. Users may use any number of different electronic user devices 120A-C, such as general purpose computers, mobile phones, smartphones, personal digital assistants (PDAs), portable computing devices (e.g., laptop, netbook, tablets), desktop computing devices, handheld computing device, kiosk-based terminal, pulse code system, web TV, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage (memory), and processors for executing instructions that may be stored in memory and/or non-transitory computer-readable storage-media 18 (e.g., floppy disk, hard disk, computer network, random access memory (RAM), CD Rom, ZIP disks, or the like). User devices 120 may also have a display (e.g., cathode ray tube (CRT), light-emitting-diode (LED), liquid-crystal-diode (LCD), plasma, audio-visual, touch-screen, other tactile displays) and/or other input components (e.g., a keyboard, mouse, trackball, touch pad, microphone).

Betting server 130 may include any type of server or other computing device as is known in the art, including standard hardware computing components such as network and media interfaces, non-transitory computer-readable storage, and processors for executing instructions or accessing information that may be stored in memory. The functionalities of multiple servers may be integrated into a single server; alternatively, tasks may be shared among a group of multiple servers. Any of the aforementioned servers (or an integrated server) may take on certain client-side, cache, or proxy server characteristics. These characteristics may depend on the particular network placement of the server or certain configurations of the server.

Network environment may optionally include one or more data providers 140. Depending on the type of competition-based events, different data providers 140 may be relied upon to provide results of such events. Such data providers 140 may include published (e.g., online) reports from the leagues running the competition-based events and/or third-party reporting services (e.g., feeds reporting on sporting news). In some instances, the outcomes may be aggregated from multiple data providers 140. Such data providers 140 may incorporate any type of computing device or server described above with respect to user devices 120 or betting server 130, any components thereof, including memory or databases, and any other type of device known in the art for providing data.

Figure 2:
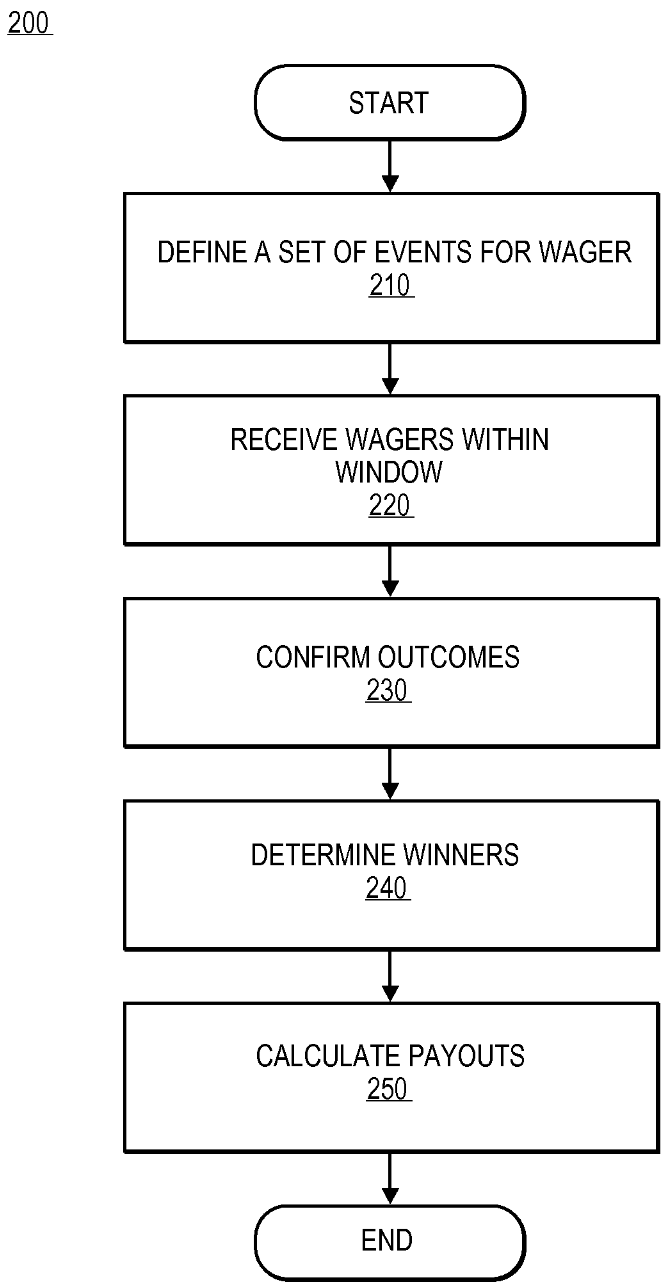
FIG. 2 illustrates an exemplary method for progressive betting pools.

FIG. 2 illustrates a method 200 for progressive betting pools. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a set of competition-based events may be defined for wagering by an administrator, wagers may be received from various client devices within a defined window of time, information regarding outcomes of the events associated with the wager may be received and confirmed, winners may be determined based on one or more algorithms (including tie-breakers), and payouts may be calculated for each determined winner.

In step 210, the set of competition-based events may be defined by an administrator of the betting pool. For example, the set may be defined as a set of football matches (e.g., during a particular week of the regular season). For each wager, the player may specify outcomes (e.g., winners of each games) and additionally rank the teams playing during the particular week based on any metric (e.g., number of goals scored). For example, the objective may be to correctly select and rank six teams that scored the highest number of goals. Such information is entered by the administrator into the betting server 130, which may store information a plurality of competition-based events.

The precise number of selections may be set and adjusted by the administrator, who may also define various other rules for the betting pool. The betting pool may require, for example, that wagers may only be placed where a set of games meet a minimum number. For example, an administrator may only allow for a betting pool to be available where there are at least eight games in a week. If a game is cancelled or postponed, for example, this may result in fewer than eight games occurring in that week. As such, any wagers placed for that set of games may be voided. Alternatively, if a game is rescheduled within that week, the wager may stand.

Figure 3:
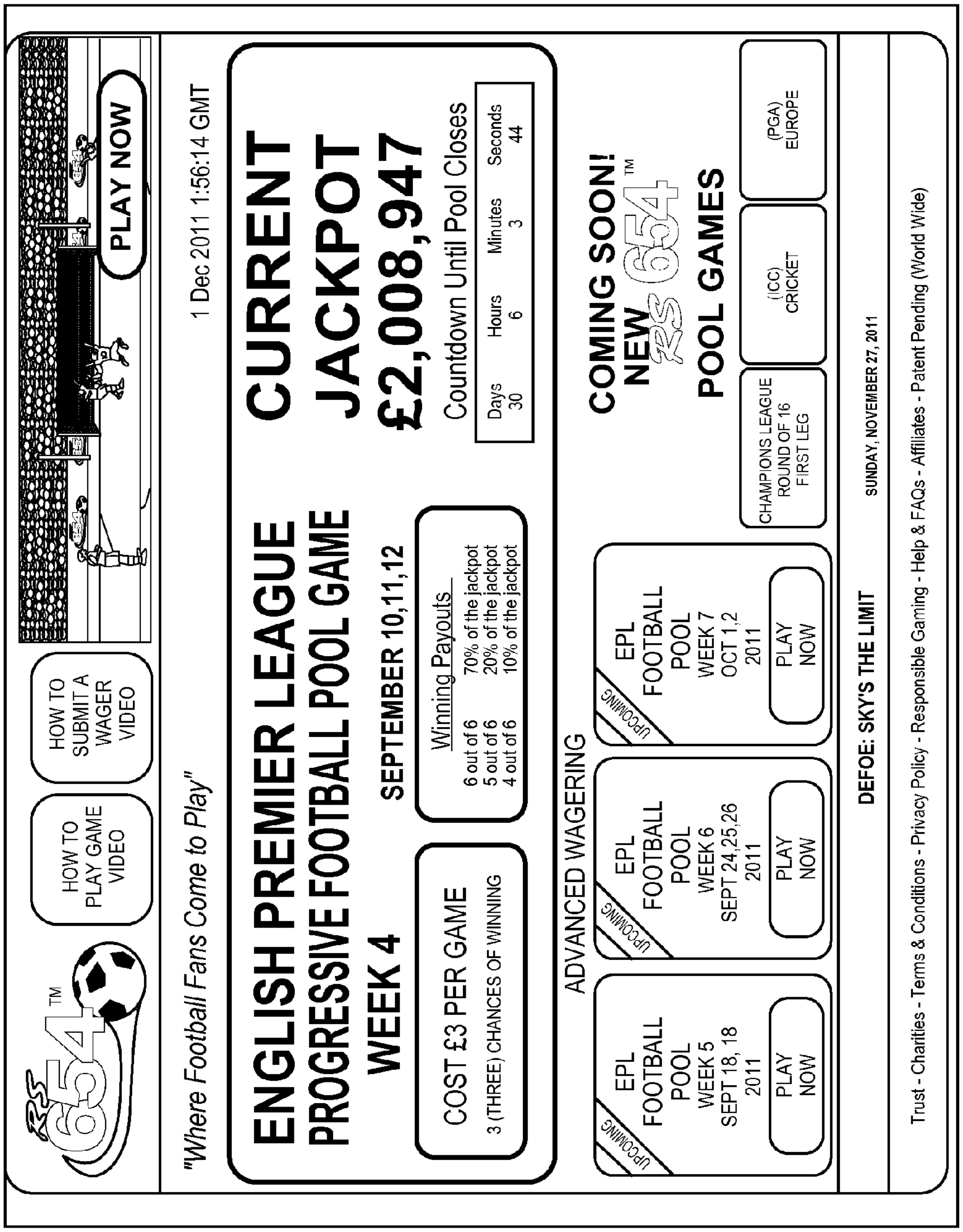
FIG. 3 is a screenshot of an exemplary home page of a site used for progressive betting pools.
Figure 4:
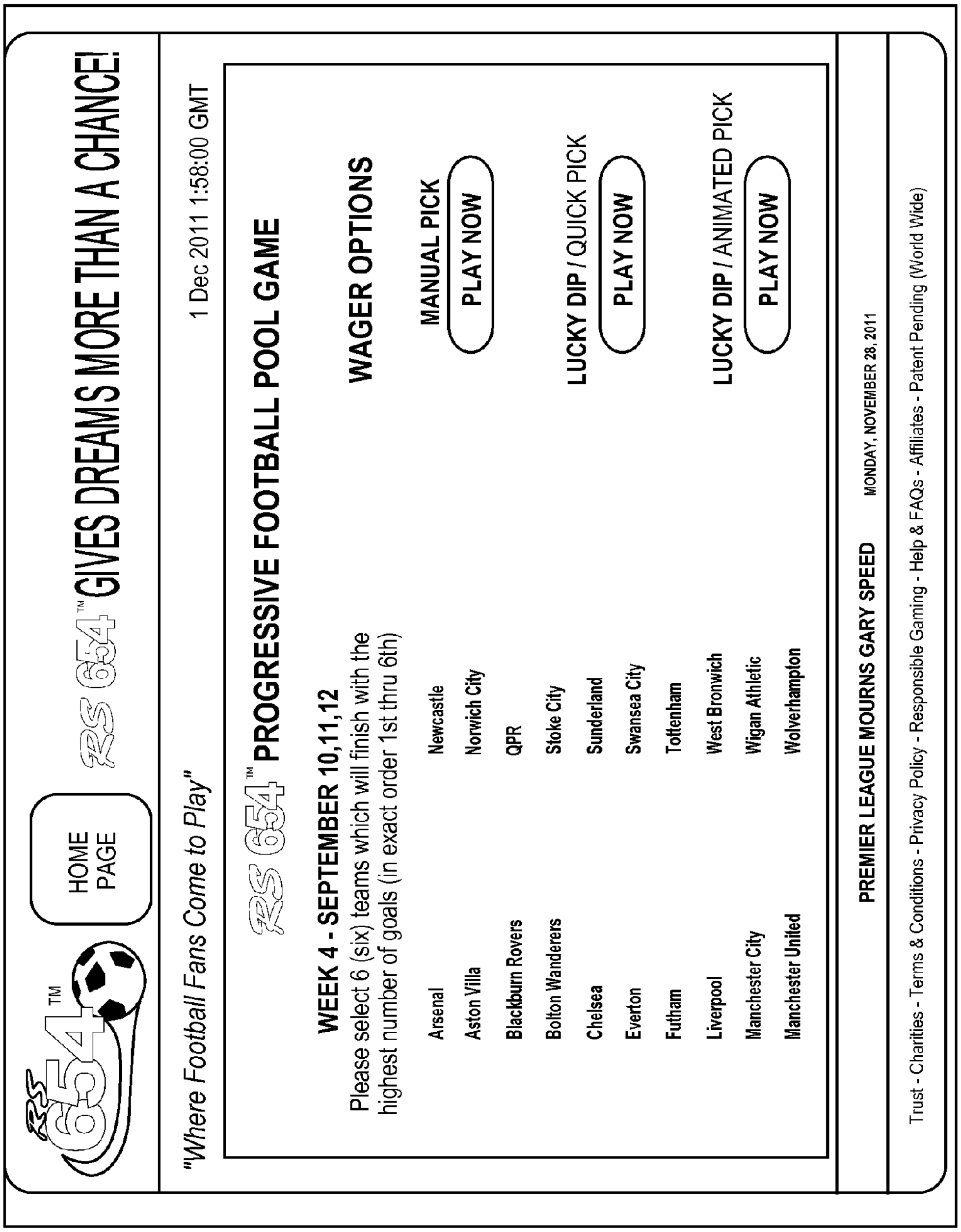
FIG. 4 is a screenshot of an exemplary web page displaying betting options for progressive betting pools.
Figure 5:
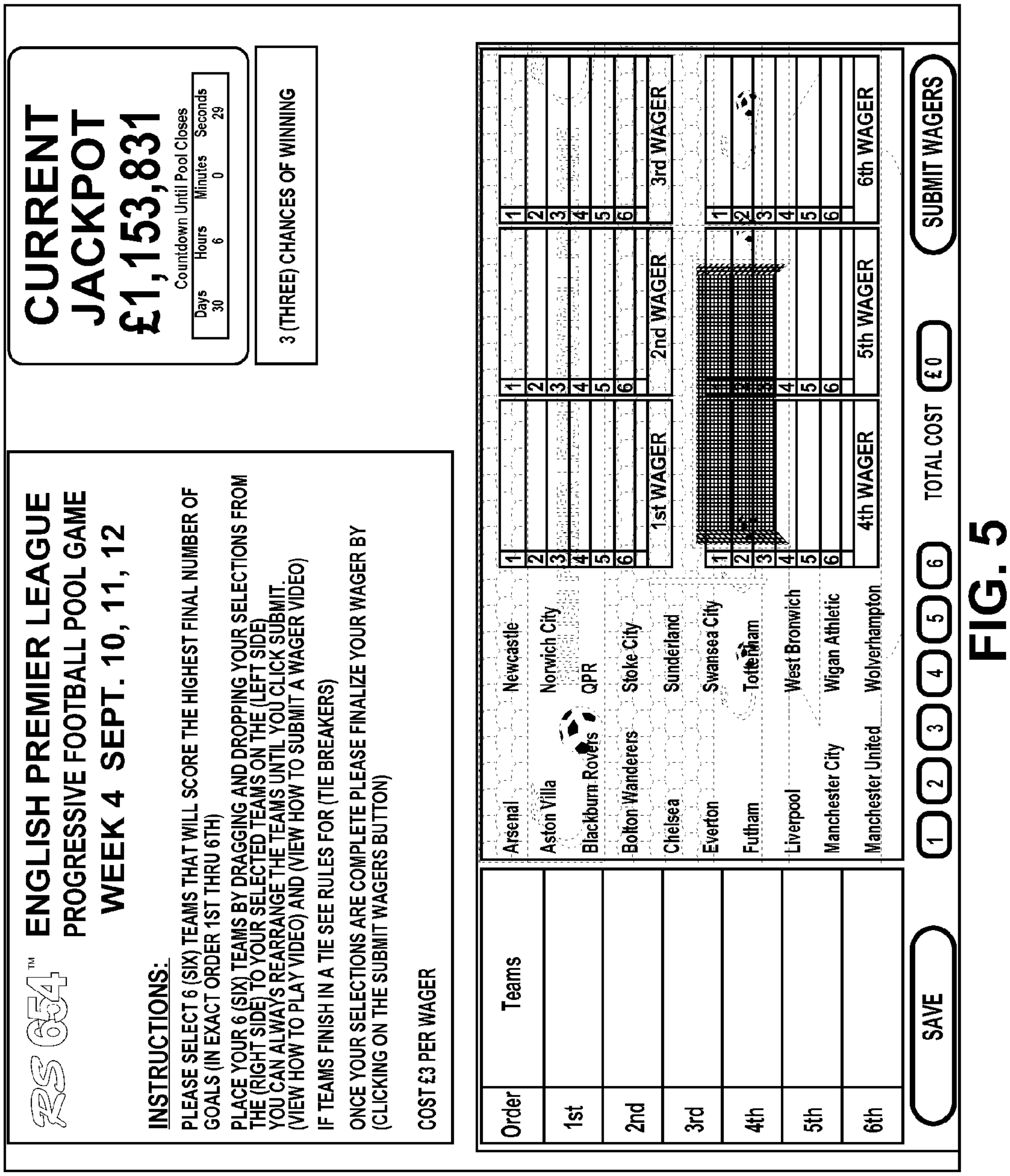
FIG. 5 is a screenshot of an exemplary web page displaying manual betting options for progressive betting pools.
Figure 6:
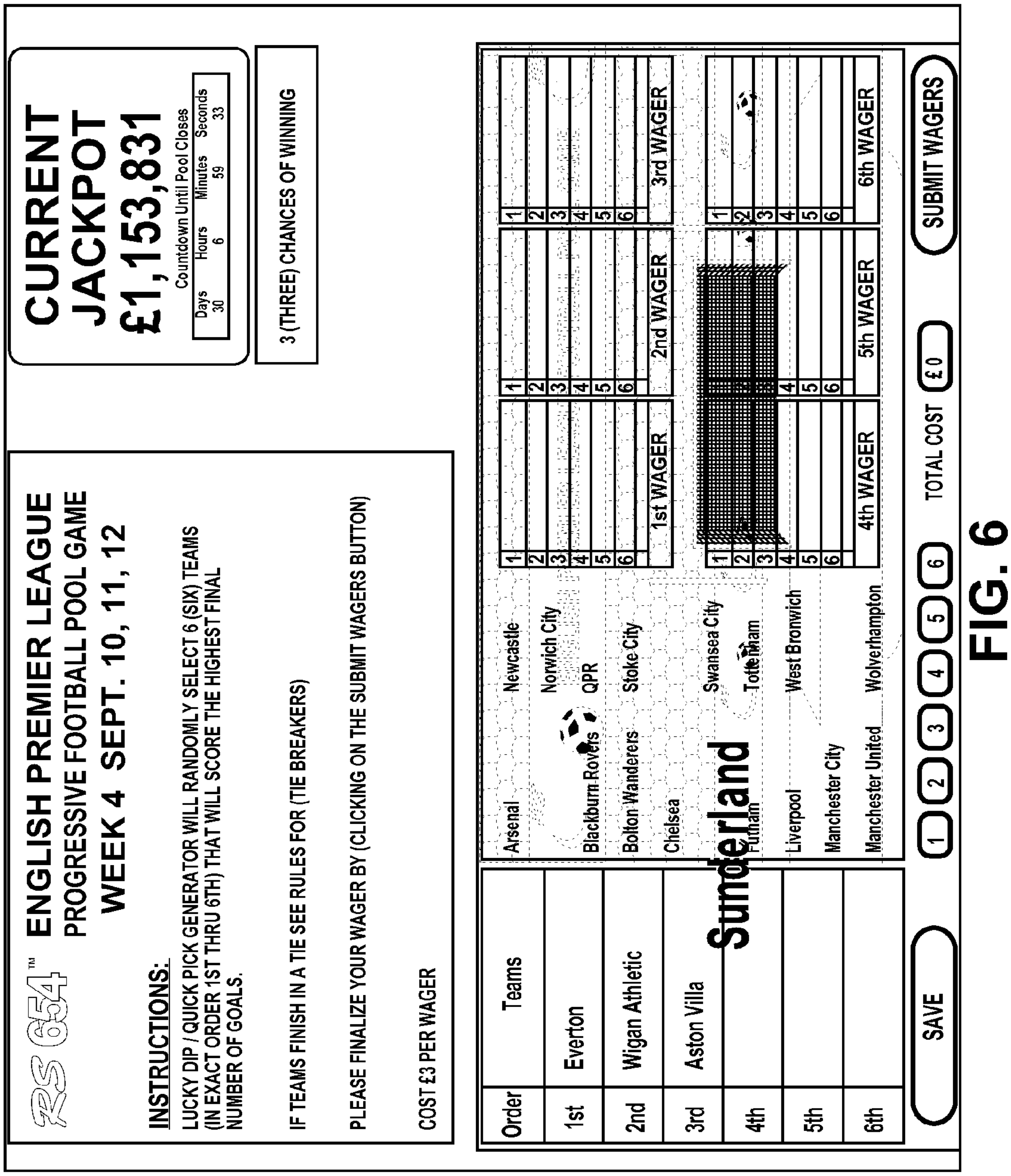
FIG. 6 is a screenshot of an exemplary web page displaying automated betting options for progressive betting pools.
Figure 7:
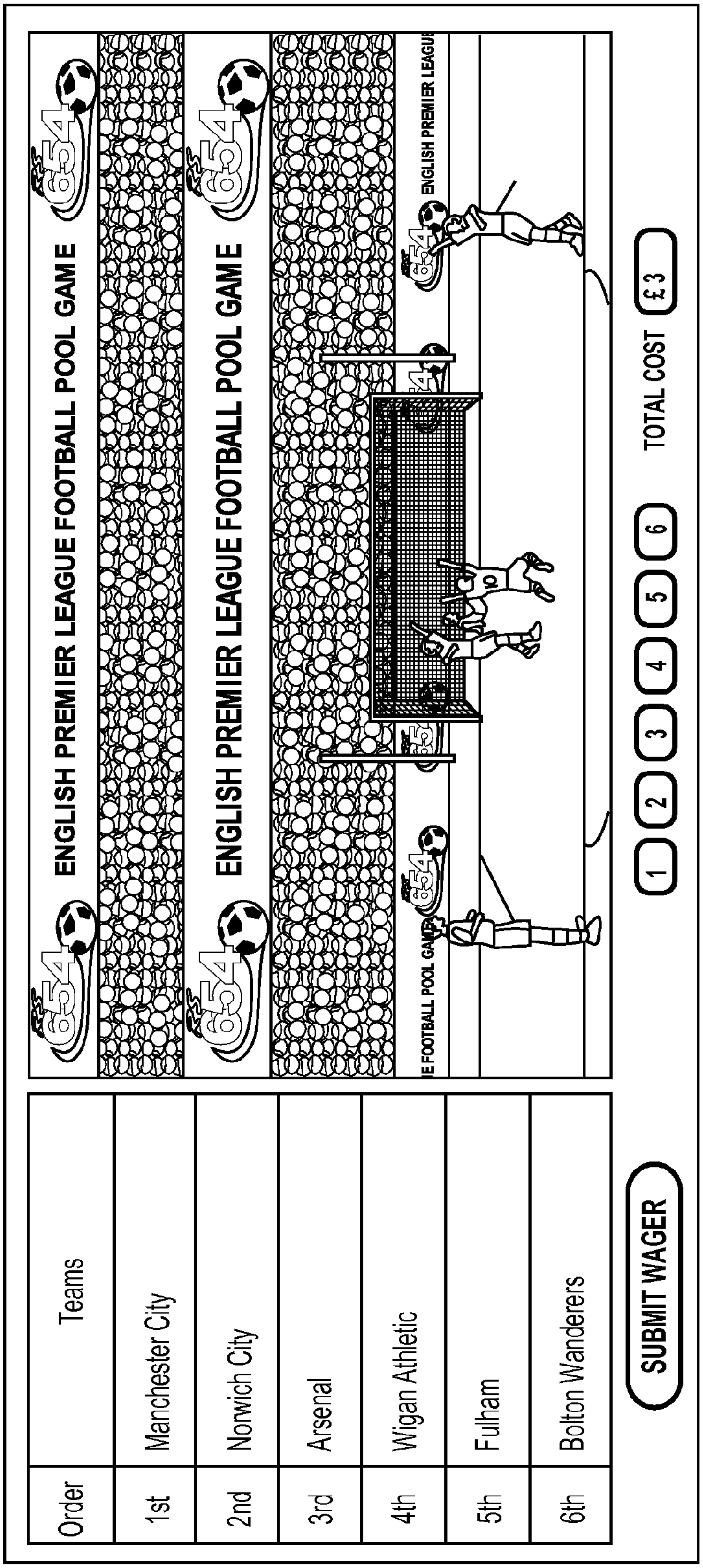
FIG. 7 is a screenshot of an exemplary web page displaying alternative automated betting options for progressive betting pools.

The set of competition-based events available for wagering may be made available for viewing on a variety of client devices 120. Some client devices 120 may be wired (e.g., kiosks, terminals, desktop computing devices), and some client devices 120 may be wireless (e.g., smartphone, tablets, laptop computing devices). Such client devices 120 may be used by a betting individual to access and view the sets of competition-based events available for wagers. FIG. 3 is a screenshot of an exemplary home page of a site that offers progressive betting pools. Some sites may require betting individuals to register and provide profile information (e.g., name, address, email, age, method of payment) before wagers are accepted. Such information may be used to verify the betting individual's identity and/or eligibility to place wagers. Any tools for registrations, sign-ins, and processing financial transactions known in the art may be utilized.

FIGS. 4, 5, 6, and 7 are screenshots of exemplary web pages displaying various betting options for progressive betting pools. Betting individuals may manually select the teams believed to win their matches, as well as specify a ranking (e.g., by expected number of goals). Alternatively, the betting individual may wish for the computing device to automatically make random selections. Various betting options known in the art may be incorporated into the progressive betting pools.

In step 220, wagers are received within the window of time associated with the defined set of competition-based events. The administrator may define the window of time during which wagering is allowed. For example, a wagering window may open at the start of the season and close before the first game in the particular set of games being wagered upon. The window may also be adjusted by an administrator. During the wagering window, a player may place the wager, which includes make selections either manually or automatically via random selections. Such a player may use any kind of client device 120 to submit the wager to betting server 130, which only accepts the wager if it is received within the defined window for the set associated with the wager.

In step 230, information regarding the actual outcomes of the set of competition-based events may be received and confirmed. While some embodiments allow for manual entry of outcomes, a variety of data providers 140 may be used to automatically provide updates on the set of competition-based events. Depending on the event, different data providers 140 may be relied upon. As a competition-based event occurs, information regarding that event may be updated in real-time such that betting individuals may check in to see how well their wagered selections align with current information regarding outcomes. The information may be provided by one or more data providers 140 (e.g., online news sources). In some circumstances, the data from one data provider may be verified and confirmed (e.g., by comparison to other data sources). The data may be used to determine the outcomes for the set of competition-based events that are the subject of the wagers. For example, where the objective of the betting pool is to select and rank six teams who scored the highest number of goals in a given week, a running tally may be maintained regarding the teams who played that week. Once all the games have concluded, the running tally may reveal the top six teams in a particular order (which may or may not require application of one or more tiebreakers). FIG. 8 is a screenshot of exemplary tables of results for a set of competition-based events.

In the event that a particular competitor (e.g., team) ties with another in terms of a particular metric, various tie-breakers may be applied to determine a ranking. For example, one team may have scored the same number of goals as another team. In such a situation, one or more tie-breakers may be applied. An exemplary set of tie-breakers may be applied as follows:

1. Determine which team scored the highest number of away team goals.
2. Determine which team had the most shots on goal.
3. Determine which team had the most corner kicks.
4. Determine which team had the fewest yellow cards.
5. Determine which team had the most percentage time of possession.

In step 240, winners are determined based on the information regarding actual outcomes, the selections specified by each wager, and one or more algorithms. Where two or more betting individuals tie in terms of having made the same number of correct selections corresponding to actual outcomes (e.g., picked the correct winning teams), tie-breakers and algorithms may be used to rank the winning individuals. For example, correct predictions as to number of goals may be used as a ranking metric in the event of a tie between betting individuals and their wagers.

In step 250, the payouts are calculated, and winners (and/or other participants) may be notified as to the same. For each set of competition-based events, the administrator may define the particular payout structure. For example, the payout structure may indicate that a player who selected and ranked all six teams correctly may win a certain amount (e.g., $1 million). Payout structures may or may not allow for prizes to players who make fewer correct selections/rankings (e.g., select/rank five out of six, select/rank four out of six). For example, a player who selected and ranked only five teams correctly may win a lesser amount (e.g., $200,000). Where two or more players make the same number of correct selections/rankings, those players may split the associated winnings. In some instances, the payout may be calculated as a percentage of the total pool. As such, a player who has submitted a wager with the correct selections may win at least a part of a payout.

Payout Structure 6 out of 6 70% of the jackpot prize pool 5 out of 6 20% of the jackpot prize pool 4 out of 6 10% of the jackpot prize pool Where there is no winner (e.g., 6 out of 6), the jackpot may be carried over into the jackpot for the following week. As such, the jackpot may be progressive and can grow while there is no winner.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for progressive betting pools, the method comprising:

storing information in memory regarding a plurality of competition-based events, wherein each competition-based event has a plurality of possible outcomes;

receiving wagers sent over a communication network from a plurality of client devices, each wager predicting a set of outcomes for a set of competition-based events;

receiving information sent over the communication network regarding actual outcomes of the set of competition-based events;

executing instructions stored in memory, wherein execution of the instructions by a processor:

determines whether there are any winners for the set of competition-based events, wherein a winner is identified based on an associated wager correctly predicting one or more of the actual outcomes for the set of competition-based events, ranks any determined winners based on one or more ranking metrics associated with the set of competition-based events, wherein the ranking metrics include at least one tie-breaking metric that is applied to tied rankings; and generates a notification display regarding the determination regarding winners and associated rankings.

2. The method of claim 1, further comprising storing information in memory regarding a jackpot associated with the set of competition-based events.

3. The method of claim 2, further comprising calculating a payout for each of the determined winners.

4. The method of claim 3, wherein the calculated payout is based on one or more of the jackpot, the rankings associated with the determined winners, and a predetermined payout structure.

5. The method of claim 2, wherein the determination comprises initially determining that there are no winners and carrying over the jackpot to another set of competition-based events.

6. The method of claim 1, wherein the set of competition-based events is associated with a predefined window of time for placing wagers.

7. The method of claim 6, further comprising determining whether each received wager is placed within the predefined window and accepting only wagers that are placed within the predefined window.

8. The method of claim 1, wherein the set of competition-based events is associated with a predefined minimum number of events.

9. The method of claim 8, further comprising determining whether the set of competition-based events meets the predefined minimum number of events and accepting wagers only when the set of competition-based events meets the predefined minimum number of events.

10. A system for progressive betting pools, the system comprising:

memory that stores information regarding a plurality of competition-based events, wherein each competition-based event has a plurality of possible outcomes;

a communication interface that:

receives wagers sent over a communication network from a plurality of client devices, each wager predicting a set of outcomes for a set of competition-based events, and receives information sent over the communication network regarding actual outcomes of the set of competition-based events;

a processor that executes instructions stored in memory, wherein execution of the instructions by the processor:

determines whether there are any winners for the set of competition-based events, wherein a winner is identified based on an associated wager correctly predicting one or more of the actual outcomes for the set of competition-based events, ranks any determined winners based on one or more ranking metrics associated with the set of competition-based events, wherein the ranking metrics include at least one tie-breaking metric that is applied to tied rankings; and generates a notification display regarding the determination regarding winners and associated rankings.

11. The system of claim 10, wherein the memory further stores information regarding a jackpot associated with the set of competition-based events.

12. The system of claim 11, wherein the processor further executes instructions to calculate a payout for each of the determined winners.

13. The system of claim 12, wherein the calculated payout is based on one or more of the jackpot, the rankings associated with the determined winners, and a predetermined payout structure.

14. The system of claim 11, wherein the processor determines whether there are any winners by initially determining that there are no winners and carrying over the jackpot to another set of competition-based events.

15. The system of claim 10, wherein the set of competition-based events is associated with a predefined window of time for placing wagers.

16. The system of claim 15, wherein the processor further executes instructions to determine whether each received wager is placed within the predefined window and accept only wagers that are placed within the predefined window.

17. The system of claim 10, wherein the set of competition-based events is associated with a predefined minimum number of events.

18. The system of claim 17, wherein the processor further executes instructions to determine whether the set of competition-based events meets the predefined minimum number of events and accept wagers only when the set of competition-based events meets the predefined minimum number of events.

19. A non-transitory computer-readable storage medium, having embodied thereon a program executable by a processor to perform a method for progressive betting pools, the method comprising:

storing information regarding a plurality of competition-based events, wherein each competition-based event has a plurality of possible outcomes;

receiving wagers from a plurality of client devices, each wager predicting a set of outcomes for a set of competition-based events;

receiving information regarding actual outcomes of the set of competition-based events;

determining whether there are any winners for the set of competition-based events, wherein a winner is identified based on an associated wager correctly predicting one or more of the actual outcomes for the set of competition-based events;

ranking any determined winners based on one or more ranking metrics associated with the set of competition-based events, wherein the ranking metrics include at least one tie-breaking metric that is applied to tied rankings; and generating a notification display regarding the determination regarding winners and associated rankings.

* * * * *